United States Patent [19]

Holroyd et al.

[11] Patent Number: 4,929,292
[45] Date of Patent: May 29, 1990

[54] METHOD FOR THE MANUFACTURE OF A PNEUMATIC TIRE

[75] Inventors: Eric Holroyd, High Legh Park; Anthony R. Wright, Southport, both of England

[73] Assignee: Apsley Metals Limited, England

[21] Appl. No.: 214,842

[22] Filed: Jun. 30, 1988

Related U.S. Application Data

[63] Continuation of Ser. No. 891,113, Jul. 31, 1986, abandoned.

[30] Foreign Application Priority Data

Aug. 3, 1985 [GB] United Kingdom ............... 85 19579

[51] Int. Cl.$^5$ .............................................. B29D 30/32
[52] U.S. Cl. .................................... 156/132; 156/135; 156/136
[58] Field of Search ............ 156/117, 123, 130, 130.7, 156/131–136, 177, 415, 437, 439, 440, 452, 397; 152/539, 540, 545, 548, 550, 552, 554, 559, 560; 245/1.5

[56] References Cited

U.S. PATENT DOCUMENTS

| | | |
|---|---|---|
| 1,294,063 | 2/1919 | Dickinson .................. 152/545 X |
| 1,337,207 | 4/1920 | Doughty . |
| 1,726,755 | 9/1929 | Morris . |
| 1,875,643 | 9/1932 | Musselman .............. 156/135 X |
| 3,336,964 | 8/1967 | Alexeff . |
| 3,442,747 | 5/1969 | Brey ............................ 156/131 X |
| 3,649,411 | 3/1972 | Bolles ......................... 156/177 X |
| 3,815,652 | 6/1974 | Pouilloux . |
| 3,853,653 | 12/1974 | Olbert et al. .............. 156/130.7 |
| 4,199,393 | 4/1980 | Brown et al. ............. 156/132 X |
| 4,468,267 | 8/1984 | Irie ............................ 156/133 X |
| 4,602,973 | 7/1986 | Holroyd et al. .............. 156/177 |

FOREIGN PATENT DOCUMENTS

WO83/02749  8/1983  PCT Int'l Appl. .
256290  8/1926  United Kingdom ............... 152/548

Primary Examiner—Michael W. Ball
Assistant Examiner—Geoffrey L. Knable
Attorney, Agent, or Firm—Stevens, Davis, Miller & Mosher

[57] ABSTRACT

A method of manufacture of a tire in which a carcass ply is formed by winding a continuous cord around a pair of spaced members to form a ply (31) having loops (36) at its edges. The cord ply is rubberized and support elements (32) (33) are located in the loops (36) to form a cylindrical ply having spaced hooped support elements at each ply edge. Bead wire assemblies (40) and (41) are located coaxially of the ply together with the support elements which are subsequently incorporated in the bead wire assemblies.

There is also provided a tire building former on which the above method can be performed. The former (100) comprises at least three coaxial discs (101), (102), (106) for supporting a carcass ply 30 on their radially outer surfaces. The central disc (106) is axially movable between the two other discs so as to support a portion of an elastomeric ply (103) helically wound onto the former (100) from a strip (104).

7 Claims, 6 Drawing Sheets

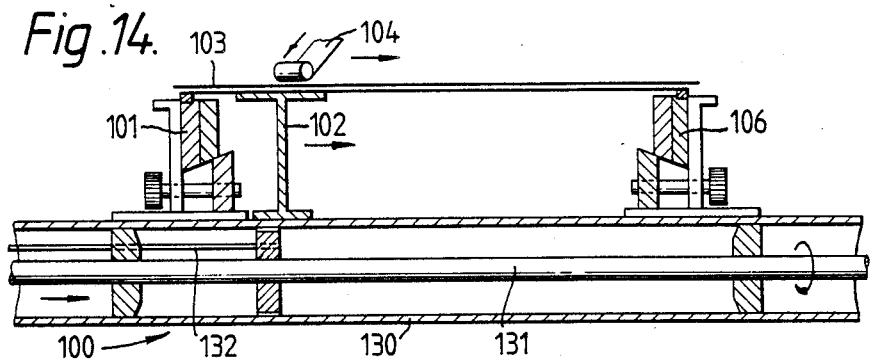
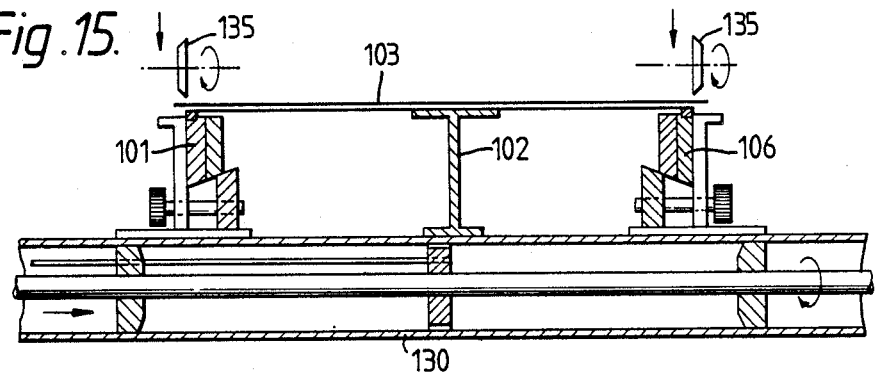
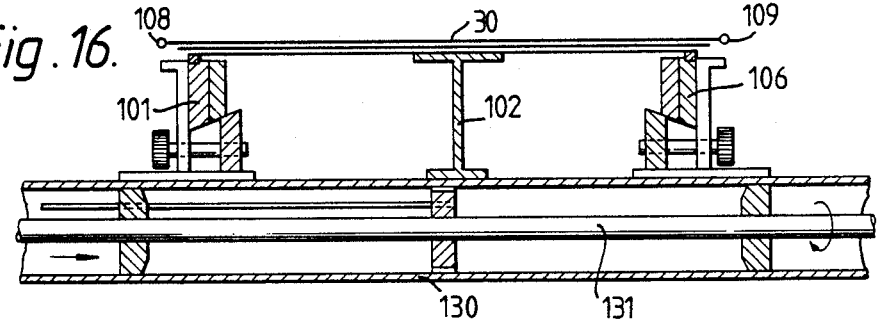
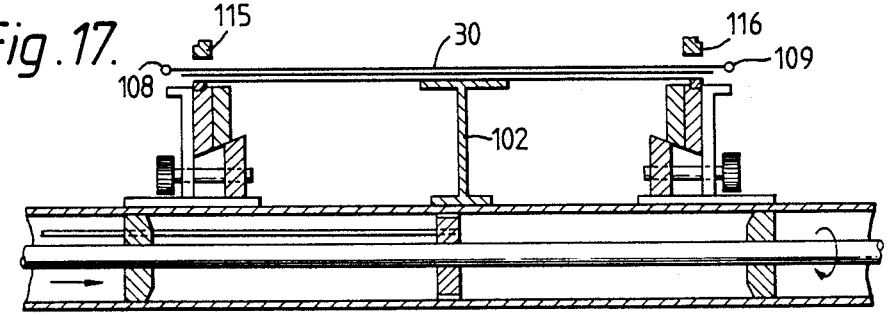

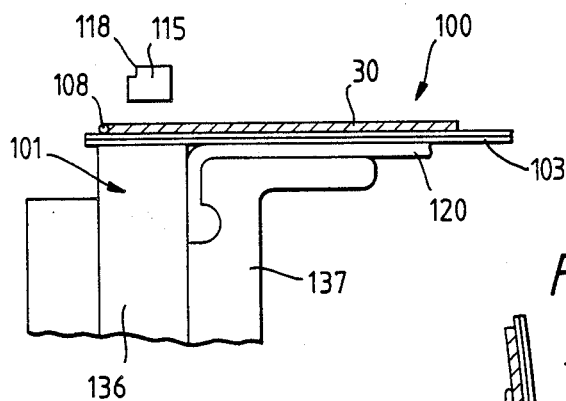
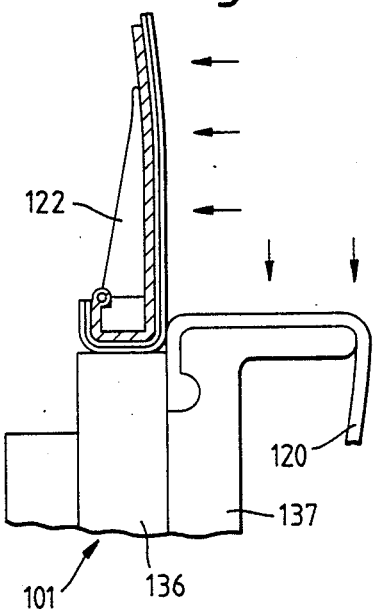
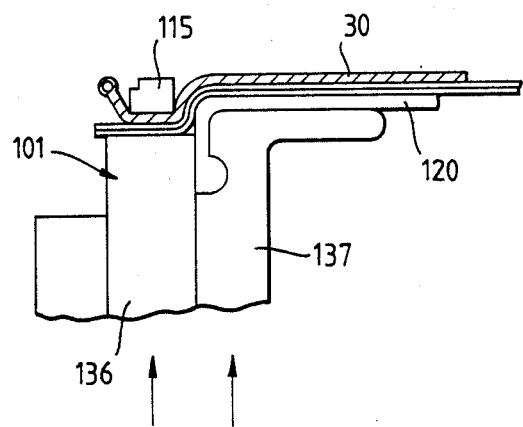
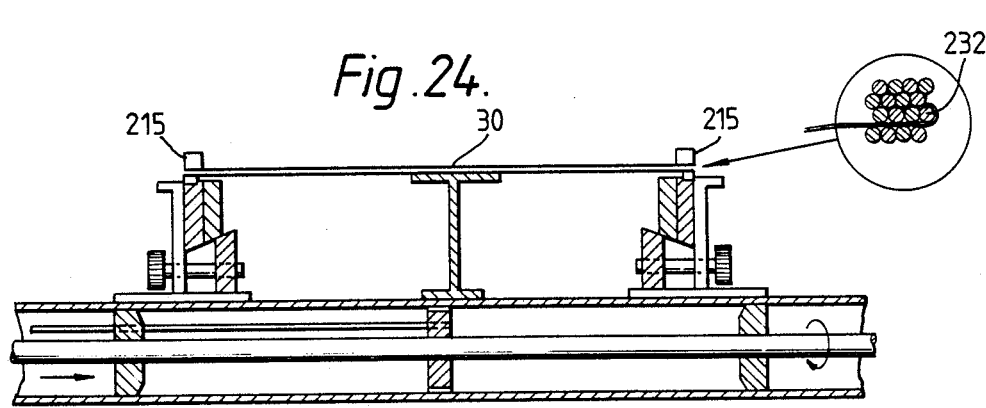

METHOD FOR THE MANUFACTURE OF A PNEUMATIC TIRE

This application is a continuation, of application Ser. No. 891,113, filed July 31, 1986, now abandoned.

This invention relates to methods and apparatus for the manufacture of pneumatic tires.

In the conventional manufacture of radial carcass pneumatic tires a ply of parallel rubberized tire cords is laid on a drum or former with the cords extending axially of the cylindrical former, over an inner liner, and the bead wire assemblies are placed in axially spaced positions coaxially around the ply, following which the ply is expanded into engagement with the bead wire assemblies and the axially outer portions of the ply are turned around the bead wire assemblies to provide ply "turn ups" which in the shaped and finished tire may extend for a considerable distance radially outwardly from the bead wire assemblies.

One object of the present invention is to provide a method of manufacture of a tire and apparatus therefore in which the bead "turn up" can be substantially reduced.

The invention is particularly suitable for use in the manufacture of a tire having a carcass ply produced by a method and apparatus as described in GB 2159185A and its U.S. equivalent Pat. No. 4,602,973.

According to the invention there is provided a method of manufacture of a pneumatic tire including winding a cord reinforcement around a pair of spaced members to form a ply of continuous reinforcement cord having a series of loops adjacent the edges of the ply, rubberizing the cords to form a reinforced elastomeric ply, locating at least one support element in the loops at each edge of the ply to form hooped support elements at each ply edge and shaping the ply into a cylindrical form, locating a bead wire assembly coaxially of the cylindrical ply together with the support elements and incorporating the support elements in each respective bead wire assembly to anchor the loops of cord to each respective bead assembly.

The support elements may be wires which are formed into rings the ends of which may or may not be joined together. The support elements may be formed as an integral portion of the bead wire which is passed through the loops on each side of the ply and is then hooped and forms part of the bead assembly which comprises bundled wire hoops.

Alternatively when built into a tire the support elements may be circled and welded and fitted against the bead wire assemblies so as to anchor the loops of cord securely. Each bead wire assembly may be pre-formed with a notch suitably positioned to receive the associated support wire.

The invention further provides a tire building former comprising a series of rotatable discs for supporting a tire carcass on their outer surfaces, at least one disc being arranged to support part of a tire inner liner formed as a winding thereon and to travel during the winding process from a position at one end of the former to a position at the other end of the former.

Embodiments of the invention will now be described, with reference to the accompanying drawings, in which:

FIG. 1 is a diagrammatic view of a carcass ply and support elements as utilized in the present invention also showing an enlarged detail, FIG. 2 is an alternative carcass ply and bead assemblies which may also be utilized in the present invention also showing an enlarged detail, FIGS. 3 to 11 are diagrammatic axial cross-sectional views showing stages in the manufacture of a pneumatic tire carcass and its incorporation into a tire tread assembly;

FIGS. 14 to 20 are similar views to those of FIGS. 1 to 9, showing an alternative process, and showing details of the former in cross-section only above the centerline of the former;

FIGS. 21 to 23 show in more detail the former illustrated in FIGS. 14 to 20, and FIG. 24 shows an alternative step using the carcass ply of FIG. 2.

Figure 3:
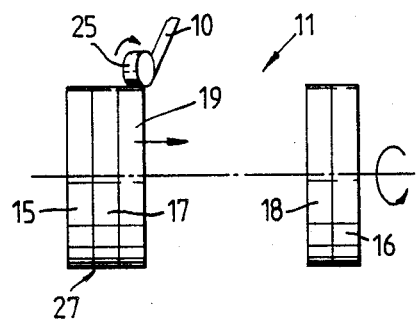
Figure 4:
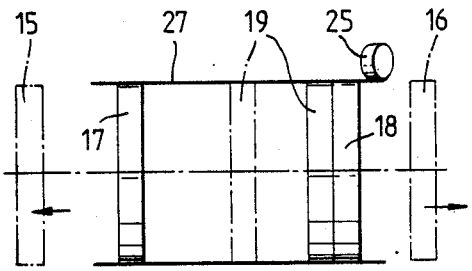
Figure 5:
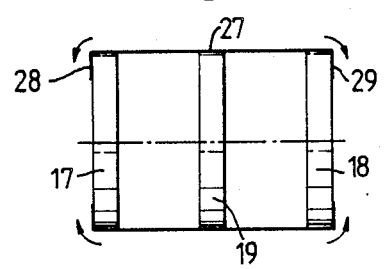

With reference to FIGS. 3 to 11, the sequence of steps in the manufacture of a pneumatic tire is as follows:

FIGS. 3 to 5 illustrate a method for the preparation of a rubber inner liner 27 for the tire from a narrow strip 10 which may be fed from a stock roll, or preferably from a small calendar, adjacent to a tire building former 11 which comprises a series of coaxial, axially movable discs 15, 16, 17, 18 and 19. The discs 15 to 19 each have a cylindrical outer surface for supporting the tire carcass or part of the tire carcass at various stages of its manufacture. The former 11 has a diameter larger than the bead diameter of the tire to be built thereon.

As shown in FIG. 3 the inner liner 27 is in process of formation by winding the strip 10 as a continuous helical axially extending winding, initially on the rotating discs 15, 17 and 19, which are grouped together at one end of the former 11, and a pressing roller 25 is used to lay the strip on the discs and the winding processes by axial movement of the roller 25 from left to right to form a continuous butt - or scarf-jointed layer. Normally, two layers of the strip 10 are wound with the joints of the second layer staggered relative to the joints of the first layer.

FIG. 4 shows the completion of the winding to form the inner liner 27. Since the winding is laid helically it will be necessary for the ends to be trimmed (this step is not shown) and the discs 15 and 16 are then removed axially leaving the liner 27 supported on discs 17, 19 and 18 as illustrated in FIG. 4. It will be noted that the discs 17 and 18 remain axially stationary and that the disc 19 travels, during the winding process, from the position adjacent disc 17 shown in FIG. 3 to the position shown adjacent the disc 18 in full lines in FIG. 4 at the opposite end of the former. The disc 19 moves axially to remain in alignment with the strip so as to support the strip as it is wound across the former. This enables a hollow former to be employed, and thus to allow all the tire building operations including shaping to be carried out on the same former. After the winding of the inner liner the disc 19 returns to the position shown in dotted lines in FIG. 4 in the central region of the former.

Figure 6:
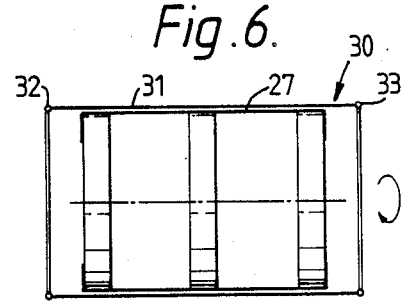

FIG. 5 shows the end portions 28, 29 of the liner turned down (radially inwardly) against the end surfaces of the discs 17 and 18. The inner liner is now in a suitable condition to receive a carcass reinforcement ply 30 as illustrated in FIG. 6.

The ply 30 is conveniently manufactured by apparatus similar to that disclosed in published patent application GB2159185A (U.S. Pat. No. 4,602,973) which comprises a pair of longitudinally extending rotatable spindles mounted in spaced apart parallel relationship one for each edge of the ply fabric, a cord winding head, and means for rotating the winding head around the pair of spindles so as to form a winding of cord which passes around both spindles and is progressively moved axially along the spindles by helical members coaxial with the spindles and rotating in opposite directions to the direction of spindle rotation to move the winding in synchronization along both spindles.

Figure 1:
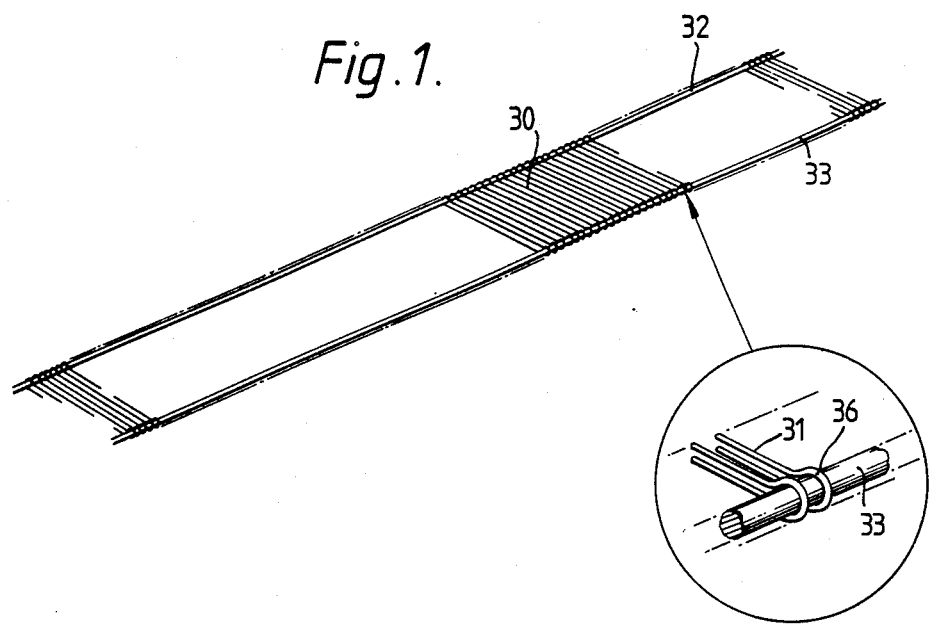

The cord ply formed on the above apparatus comprises continuous cord reinforcement 31 having a series of loops 36 adjacent the edges of the ply. This is illustrated in FIG. 1.

The preparation of the ply further comprises the step of applying thin sheets of unvulvanized rubber to the upper and lower surfaces of the cord winding as it emerges from the spindles thus producing a rubberized parallel-cord ply in which the edges having un-rubbered loops of cord protruding from the edges of the rubberized fabric. 32 and 33 preferably wire elements, but it is envisaged that other materials such as aromatic polyamides, nylons, or polyesters could be used, are located through the loops 36 at each edge of the ply subsequently to form hooped support elements at each edge of the ply when it is formed into a cylindrical shape by convolute winding.

The support element may be located into the loops after the cord ply has been rubberized or alternatively may be located into the loops prior to cords being rubberized.

One method of incorporating the wires into the loops is to pass each support element wire through the centre of a respective spindle so that the loops of cord are held on the support elements as they are removed from the spindle.

The above method may produce a continuous length of reinforced elastomeric ply which is then necessary to cut to suitable ply lengths as required. If the support elements are already in place it will be necessary to sever both the reinforcement cord and the support wires. The ply and support elements are formed in a cylindrical shape with hooped support elements at each end.

Figure 7:
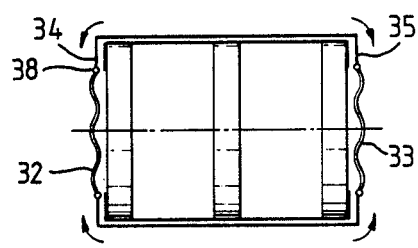
Figure 8:
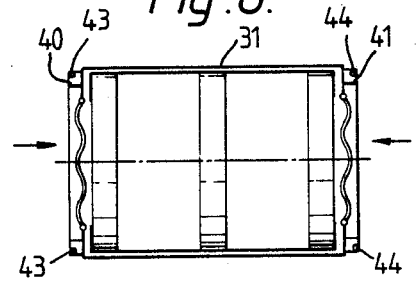

A ply 30 as shown in FIG. 6 thus comprises a cylindrical layer of rubberized cord material 31 in which the cords lie in the axial direction and have loops 36 passing around support wires 32, 33. After forming the support wires to circular form around the former their ends are welded (adjacent cord loops being parted to enable welding electrodes to be inserted without damaging the fabric) and the circled support wires are then crimped so as to enable the ends 34 and 35 of the ply to be turned radially down the ends of the former as shown in FIG. 7. The formation of the support wire 32 in its crimped state is shown in more detail in FIG. 12, which also shows the position of the weld 38 by which the ends of the wire 32 are secured together and which indicates a bead wire assembly 40 which is then brought into position adjacent the corresponding end of the former as shown in FIG. 8. A similar bead wire assembly 41 is placed at the opposite end of the former. The bead wire assembly preferably comprises a plurality of hooped turns of continuous wire bundled together into a suitable bead shape, for example, square, hexagonal, circular, etc. The bead assemblies 40 and 41 are formed with a turn of wire left out of the axially outer side of the bead bundle in the radially outer layer of wire so that there is a vacant position in the bead wire configuration in the outer layer of the bead assembly.

Figure 12:
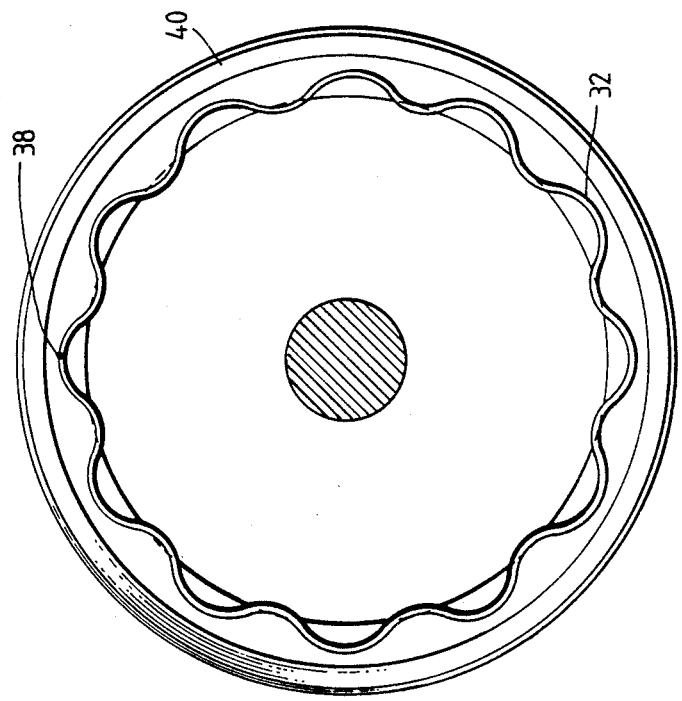
FIG. 12 is a diagrammatic axial end view showing in more detail the stage illustrated in FIG. 7.

Apparatus for forming the support wires 32, 33 to the crimped condition shown in FIGS. 7, 8, 12 and 13 is not illustrated but may take the form of a series of coaxially extending fingers arranged initially around two pitch circles of different diameters and moved axially towards the former, respectively, radially within and radially outside the wire 32 or 33. The fingers are then contracted, the outer fingers being drawn radially inwardly to a greater extent than the inner fingers so as to deform the support wire as shown in FIG. 12. This effectively reduces the diameters of the support wires to enable the bead wire assemblies 40 and 41 to be fitted against the turned-down portions 34, 35 of the ply as seen in FIG. 8.

The axially extending fingers are then withdrawn axially outwardly and released to permit the support wires 32, 33 to resume their natural circular configuration.

Figure 9:
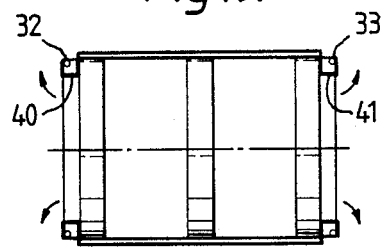

FIG. 9 shows the condition of the partly-built tire carcass following release of the support wires. As can be clearly seen in FIGS. 9 and 10, the elastomeric ply 30 passes radially inside the respective bead wire assemblies 40 and 41 and is anchored by the respective support elements 32,33 in the notches 43,44 positioned in the axially outer portion of the outer lay of the respective bead wire assembly. A further operation, shown in FIG. 10, is employed to press the support wires into engagement in the suitable annular notches 43, 44, or spaces, which have previously been formed in the bead wire assembly configuration, as previously described.

Figure 10:
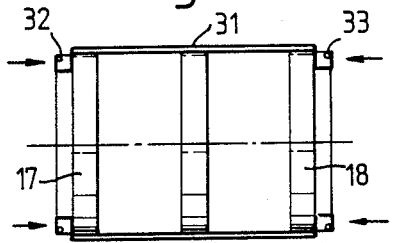
Figure 13:
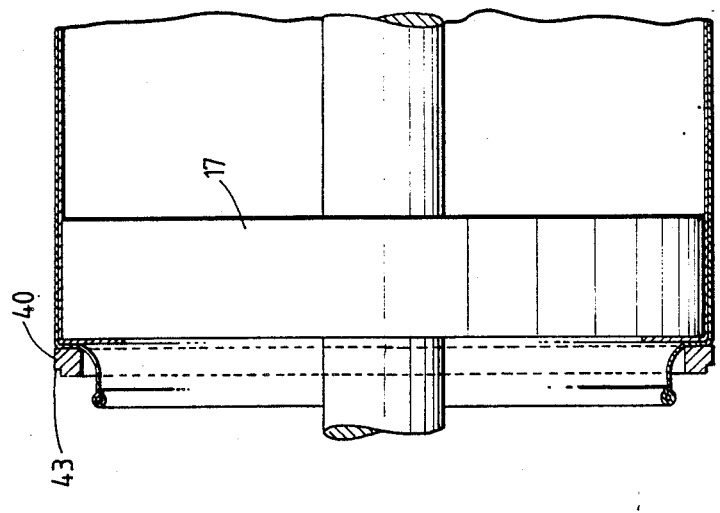
FIG. 13 is an axial view at the same stage; .

The completed ply, liner, and bead assemblies are consolidated as shown in FIG. 10 and the ply is tensioned by moving the discs 17 and 18 slightly away from one another. Other tire components such as apexes, chaffer strips, etc., may be added at this stage.

The next stage is a shaping operation as illustrated in FIG. 9, in which the interior of the tire is inflated by suitable conventional means and the discs 17 and 18 moved towards one another, thus shaping the tire carcass to toroidal form. Conveniently the shaping operation is carried out within a tread carrier ring 50 in which a previously moulded tread and breaker assembly 51 is positioned around the carcass so that the breaker and tread are assembled accurately with the breaker and tread in symmetrical relationship to the circumferential centre line of the carcass. The tread carrier ring 50 may constitute a mould, and the sidewalls may be added in pre-moulded condition, carried on suitable sidewall moulding plates, to enable the final curing operation to be carried out as described in our U.K. Application No. 2134439A.

FIGS. 14 to 20 show a second method also of manufacturing a pneumatic tire in accordance with the invention, and which also illustrates a former in greater detail.

FIG. 14 shows a winding process in which a liner is built by a progressive helical winding of a strip around a former as previously described with reference to FIGS. 1 to 9. The building former assembly 100 comprises three rotatable discs 101, 102, and 106 and its operation is generally similar to that described above in relation to FIGS. 3 and 5 except that only three discs are used. The winding commencing on a pair of discs 101 and 102 of which the disc 102 is moved to the right, supporting the liner 103 as it is wound under a moving roller 104, and the winding terminates on a disc 106.

The three coaxial discs 101, 102, 106 are mounted on a hollow shaft 130 and are axially moveable by internal rods 131 and 132. The rod 131 having oppositely handed screw threaded portions thereon for movement of the discs 101 and 106 towards or away from each other in a known manner.

FIG. 15 shows the disc 102 in its central position and the inner liner 103 being cut to length by disc cutters 135.

FIG. 16 shows the addition of the carcass reinforcement ply 30 (omitted from the lower part of the drawing) in which the portions containing support wire elements 108, 109 project beyond the edge of the former assembly, and in this example the overall diameter of the former, liner 103, and ply 30 is arranged to be slightly less than the internal diameter of bead wire assemblies 115, 116 (see FIG. 17) which are to be built into the tire carcass. It will be noted that the support wires 108, 109 may be formed as a broken ring in which the ends of the wire length are not welded together but have a short overlap to enable the circled support wires to be expanded in diameter, before welding, to the final diameter required to fit in the required position against the bead wire assembly.

Figure 18:
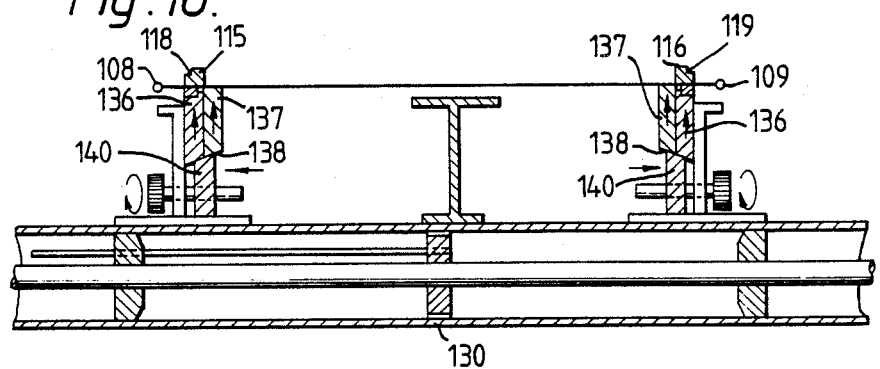
Figure 19:
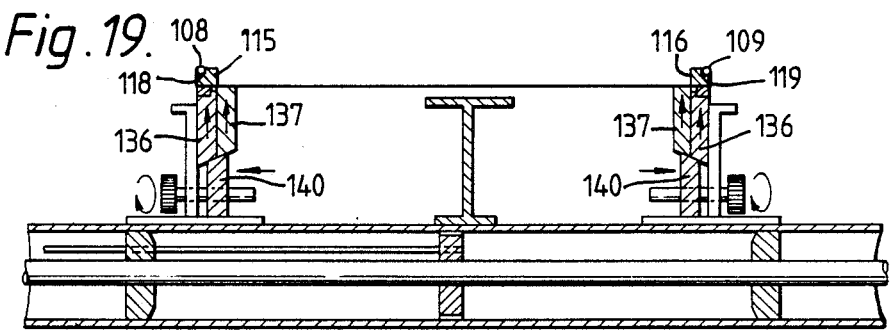
Figure 20:
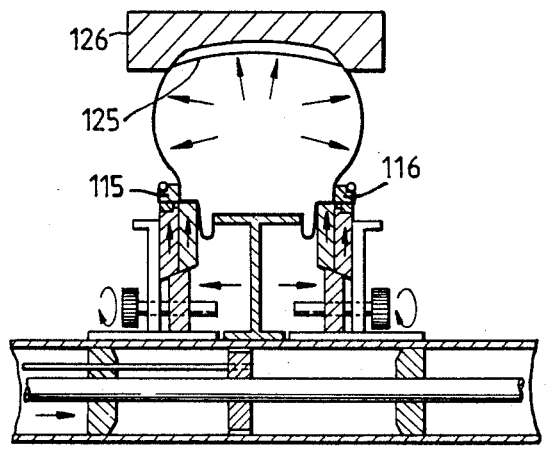
Figure 11:
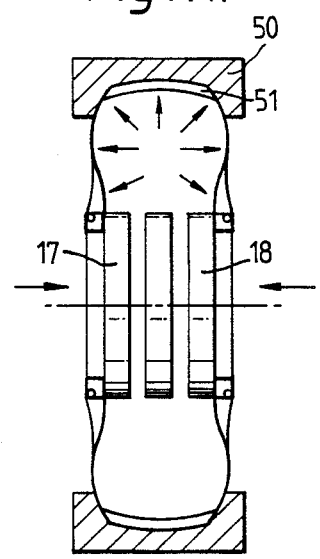

FIG. 17 shows the bead wire assemblies 115 and 116 placed in position over the liner and ply on the former 100 and FIG. 18 shows the expansion of discs 101 and 106 to grip the bead wire assemblies 115, 116, through the ply. The disc 101 and 106 include radially slidable segments 136 and 137, having inclined cam surfaces 138 on the radially inner end portions thereof which are engagable on a conical disc 140 slidably mounted on the shaft 130. The support wires 108, 109 are expanded to their required diameter i.e. with their ends abutting. The ends of the wires 108, 109 may be then welded together to form inextensible rings which as shown in FIG. 19 are then pressed by a suitable device into engagement with corresponding notches 118, 119 formed, respectively, in the bead wire assemblies 115, 116 (as previously described). As before apex strips and chaffer strips may be added at this stage. The ply is then tensioned by outward movement of the discs 101, 106. The carcass is then shaped into engagement with a tread and breaker package 125 carried in a tread moulding ring 126 as shown in FIG. 20. Finally, premoulded sidewalls carried on suitable sidewall moulding plates are added and the whole assembly is cured as described in our U.K. Application No. 2134439A.

FIGS. 21, 22 and 23 show in more detail the sequence of operations to expand the disc 101 so as to bring the ply 30 and a double thickness liner 103 into engagement with a bead wire assembly 115. The former 100 incorporates a sleeve 120 of flexible plastics material extending from one end of the former to the other and supported on the radially expansible segments 136 and 137. The purpose of the sleeve 120, when the operation of FIGS. 14 and 15 is being carried out, is to support the liner 103 whilst permitting the travelling disc 102 which is maintained in alignment with the roller 104, to move within the sleeve 120 across the axial width of the former between the discs 101 and 106. The sleeve 120 is of low-friction material to enable the disc 102 to slide freely within it, and acts to counter any tendency which the axial movement of the disc 102 might otherwise have to pull the windings apart as it moves across.

FIG. 22 shows the disc 101 and the segments 136, and 137 expanded to grip and position the bead assembly 115, the expansion of the segments 137 providing a shoulder for accurate location of the bead wire assembly.

In FIG. 23 the shaping of the tire carcass with apex strips 122 now added is illustrated, and in this operation the central portion of the sleeve 120 is deflected radially inwardly by the inflation pressure, which it serves to retain by sealing the inner parts of the former.

Figure 2:
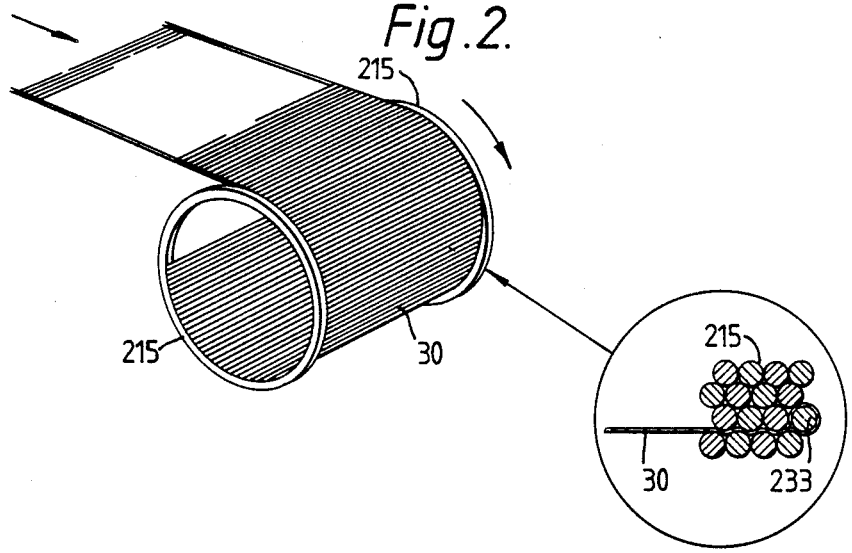

With reference to FIG. 2 and FIG. 24, in an alternative method the support elements may be formed as a single hoop of wire which is a portion of the continuous wire of the bead wire assemblies. Each bead 215 is formed of a plurality of turns of a wire, a portion of this wire may be located in the loops 36 at the respective edge of the ply 30 so that support members 232 and 233 for the loops are actually constituted by a single turn of the bead assembly 215.

Thus, in FIG. 24, the bead assemblies 215 are formed simultaneously as the ply 30 is convolutingly wound onto the former 100. The operation of the former 100 continues as before.

We claim:

1. A method of manufacture of a pneumatic tire including the steps of:
   (a) winding a single continuous reinforcing cord around a pair of spaced apart spindles to form a cord ply comprising a series of adjacent windings of said single cord with a series of cord loops adjacent each edge of the cord ply;
   (b) rubberizing the cord ply as it emerges from the spindles to form a cord reinforced elastomeric ply with said series of cord loops adjacent each edge thereof being unrubbered;
   (c) locating at least one support element in each said series of loops either prior to or after the rubberizing step;
   (d) convolute winding the elastomeric ply with said at least one support element in situ into a cylindrical form with said support elements being formed into rings by circling said support elements and winding the elastomeric ply around a former of a diameter greater than the diameter of bead wire assemblies to be incorporated in the tire, the ends of said support elements then being joined and the circled support elements crimped to reduce their diameters and turn down the edge portions of the ply;
   (e) locating bead wire assemblies coaxially of the cylindrical elastomeric ply and in situ support elements by passing each bead wire assembly over the respective reduced-diameter support element and pressing said bead wire assembly against the respective turned down edge portion of the ply, the support elements being subsequently released to expand radially and resume their natural circular configuration; and
   (f) incorporating the support elements into each bead assembly by pressing said elements into engagement with the respective bead wire assemblies to anchor the loops of cord to each respective bead assembly.

2. A method of manufacture of a pneumatic tire including the steps of:
   (a) winding a single continuous reinforcing cord around a pair of spaced apart spindles to form a cord ply comprising a series of adjacent windings of said single cord with a series of cord loops adjacent each edge of the cord ply;

(b) rubberizing the cord ply as it emerges from the spindles to form a cord reinforced elastomeric ply with said series of cord loops adjacent each edge thereof being unrubbered;

(c) locating at least one support element in each said series of loops either prior to or after the rubberizing step;

(d) convolute winding the elastomeric ply with said at least one support element in situ into a cylindrical form with said support elements being formed into a hoop configuration by winding the elastomeric ply with support elements in the loops around an expansible former which has a diameter less than the internal diameter of bead wire assemblies to be incorporated in the tire;

(e) locating bead wire assemblies concentrically of the cylindrical elastomeric ply and in situ support elements and expanding the former to grip the bead wire assemblies through the ply, then securing the ends of the support elements together to achieve a diameter required to fit against the bead wire assemblies; and (f) incorporating the support elements into each bead assembly to anchor the loops of cord to each respective bead assembly.

3. A method of manufacture of a pneumatic tire including the steps of:

(a) winding a single continuous reinforcing cord around a pair of spaced apart spindles to form a cord ply comprising a series of adjacent windings of said single core with a series of cord loops adjacent each edge of the cord ply;

(b) rubberizing the cord ply as it emerges from the spindles to form a cord reinforced elastomeric ply with said series of cord loops adjacent each edge thereof being unrubbered;

(c) locating at least one support element in each said series of loops either prior to or after the rubberizing step;

(d) forming an inner lining for the elastomeric ply by continuous helical winding of strip material around a former comprising a series of rotating discs, at least one disc travelling axially during the winding process form a position at one end of the former to a position at the other end of the former, to remain in axial alignment with the portion of the strip material being wound onto the drum, (e) convolute winding the cord reinforced elastomeric ply with said at least one support element in situ into a cylindrical form around said former and inner lining with said support elements being formed into a hoop configuration;

(f) locating bead wire assemblies coaxially of the cylindrical elastomeric ply and in situ support elements; and (g) incorporating the support elements in each bead assembly to anchor the loops of cord to each respective bead assembly.

4. A method of manufacture of a pneumatic tire including the steps of:

(a) winding a single continuous reinforcing cord around a pair of spaced apart spindles to form a cord ply comprising a series of adjacent windings of said single cord with a series of cord loops adjacent each edge of cord ply;

(b) rubberizing the cord ply as it emerges from the spindles to form a cord reinforced elastomeric ply with said series of cord loops adjacent each edge thereof being unrubbered;

(c) locating at least one support element in each said series of loops either prior to or after the rubberizing step;

(d) convolute winding the elastomeric ply with said a least one support element in situ into a cylindrical form with said support elements being formed int o a hoop configuration by winding the elastomeric ply and support elements onto a former;

(e) simultaneously locating bead wire assemblies coaxially of the cylindrical elastomeric ply and in situ support elements by forming each bead assembly from a plurality of turns of the same continuous wire, such that each bead wire assembly comprises a plurality of turns of continuous wire bundled together and the respective support element which is located in the loops at the respective ply edges is formed from a least one turn of the continuous wire so that the support elements are incorporated in each bead assembly to anchor the loops of cord to each respective bead assembly.

5. A method according to claim 4 in which the spaced apart spindles are hollow and the support elements are fed through the center of each spindle as the ply cord is wound around, to hold the loops of the cord ply emerging from the spindles.

6. A method of manufacture of a pneumatic tire including the steps of:

(a) winding a single continuous reinforcing cord around a pair of spaced spindles to form a cord ply comprising a series of adjacent windings of said single cord with a series of cord loops adjacent the edges of the ply;

(b) rubberizing the cord ply after it emerges from the spindles to form a reinforced elastomeric ply with said series of cord loops adjacent each edge thereof being rubbered, said rubberizing being done by applying thin sheets of unvulcanized rubber to the upper and lower surfaces of the cord ply as it emerges from the pair of spaced spindles;

(c) locating at least one support element in each said series of loops either prior to or after the rubberizing step;

(d) convolute winding the elastomeric ply with said at least one support element in situ into a cylindrical form with said support elements being formed into a hoop configuration;

(e) locating bead wire assemblies comprising a plurality of bundled together hoops of wire coaxially of the cylindrical elastomeic ply and in situ support elements; and (f) incorporating the support elements in situ in each said series of loops into an axially outer portion of a radially outer layer of a respective one of said bead wire assemblies while the elastomeric ply is in cylindrical form to anchor the loops of cord to each respective bead assembly, each support element within the cord loops being incorporated with its respective bead wire assembly located outside of the respective cord loops such that the elastomeric ply passes radially inside the bead wire assembly.

7. A method as claimed in claim 6 including tensioning the cords in the carcass ply after the support elements have been incorporated into the respective bead wire assemblies.

* * * * *